United States Patent [19]

Ohmi et al.

[11] Patent Number: 4,632,509
[45] Date of Patent: Dec. 30, 1986

[54] GLARE-SHIELDING TYPE REFLECTOR

[75] Inventors: Shinya Ohmi, Anjo; Hiroshi Itoh, Ohbu; Tsuyoshi Fukada, Nagoya; Yasutoshi Suzuki, Ohbu; Kunihiko Hara, Nukata, all of Japan

[73] Assignee: Nippondenso Co., Ltd., Kariya, Japan

[21] Appl. No.: 671,612

[22] Filed: Nov. 15, 1984

[30] Foreign Application Priority Data

Nov. 29, 1983 [JP] Japan .................... 58-225271

[51] Int. Cl.$^4$ ................ G02F 1/133; G02B 5/124
[52] U.S. Cl. .................... 350/283; 350/278; 350/338
[58] Field of Search .............. 350/276 R, 278, 283, 350/334, 338

[56] References Cited

U.S. PATENT DOCUMENTS

| 2,444,976 | 7/1948 | Brown . | |
|---|---|---|---|
| 3,269,267 | 11/1962 | Collins . | |
| 3,542,455 | 11/1970 | Jensen . | |
| 3,600,060 | 2/1968 | Churchill . | |
| 3,601,614 | 8/1971 | Platzer . | |
| 3,705,310 | 12/1972 | Wild . | |
| 3,787,110 | 1/1974 | Berreman et al. . | |
| 3,862,798 | 1/1975 | Hopkins . | |
| 3,869,196 | 3/1975 | Kubota . | |
| 3,921,162 | 11/1975 | Fukai et al. . | |
| 3,932,026 | 1/1976 | Spokel . | |
| 3,944,331 | 3/1976 | Janning . | |
| 3,961,181 | 6/1976 | Golden . | |
| 3,976,875 | 8/1976 | Engstrom et al. . | |
| 3,986,022 | 10/1976 | Hyatt . | |
| 4,029,393 | 6/1977 | Dungan et al. . | |
| 4,040,727 | 8/1977 | Ketchpel . | |
| 4,095,217 | 6/1978 | Tani et al. . | |
| 4,161,653 | 7/1979 | Bedini et al. | 350/278 |
| 4,200,361 | 4/1980 | Malvano et al. | 350/278 |
| 4,201,451 | 3/1980 | Jacob . | |
| 4,202,607 | 5/1980 | Washizuka et al. . | |
| 4,229,077 | 10/1980 | Schwab . | |
| 4,266,859 | 5/1981 | Togashi | 350/338 |
| 4,279,474 | 7/1981 | Belgorod . | |
| 4,342,030 | 7/1982 | Shanks . | |
| 4,390,874 | 6/1983 | Woodside . | |
| 4,408,837 | 10/1983 | Kozaki et al. | 350/338 |
| 4,491,390 | 1/1985 | Tong-Shen . | |
| 4,529,278 | 7/1985 | Nugent . | |
| 4,530,571 | 7/1985 | Conner . | |

FOREIGN PATENT DOCUMENTS

| 0111907 | 6/1984 | European Pat. Off. | 350/338 |
|---|---|---|---|
| 2416172 | 10/1975 | Fed. Rep. of Germany . | |
| 2604462 | 8/1977 | Fed. Rep. of Germany . | |
| 2732727 | 3/1978 | Fed. Rep. of Germany . | |
| 2808260 | 8/1979 | Fed. Rep. of Germany . | |
| 2111683 | 6/1972 | France . | |
| 0040348 | 3/1977 | Japan . | |
| 0039845 | 3/1980 | Japan . | |
| 0004003 | 1/1982 | Japan . | |
| 0102603 | 6/1982 | Japan . | |
| 490516 | 10/1937 | United Kingdom . | |
| 2029343 | 3/1980 | United Kingdom . | |

Primary Examiner—John K. Corbin
Assistant Examiner—Loha Ben
Attorney, Agent, or Firm—Cushman, Darby & Cushman

[57] ABSTRACT

This invention discloses a glare-shielding reflector which controls light reflectance electrically. The present invention provides a glare-shielding type reflector having a photosensor block which can detect an incident angle of a luminous flux to the reflector and a glare-shielding layer which is divided into plural units and driven individually. A glare-shielding layer formed on a front surface of a mirror is divided into plural units and only the specified glare-shielding units are automatically put into a glare-shielding state, according to the incident angle of the luminous flux to the mirror.

6 Claims, 12 Drawing Figures

GLARE-SHIELDING TYPE REFLECTOR

RELATED APPLICATIONS

The subject matter of this application is related in general to the subject matter of the following applications: Itoh et al, Ser. No. 616,185, filed June 1, 1984, Itoh et al, Ser. No. 670,015, filed Nov. 9, 1984, Ito et al, Ser. No. 593,946, filed Mar. 27, 1984 and Itoh et al (no serial number yet assigned) entitled "Driving Apparatus for Dazzle-Free Reflection Mirrors of a Vehicle", filed Feb. 13, 1985. These cases all relate in general to dazzle-free mirrors.

BACKGROUND OF THE INVENTION

1. Field of the Invention

The present invention relates to a glare-shielding type reflector, more particularly to a reflector with a preventive mechanism against glaring by electrically controlling the reflectance thereof.

For instance, the reflector of the present invention can be used as a rear view mirror for a vehicle, such as an automobile. It can protect a driver from being dazzled by the reflected beams of head lamps of a following car.

2. Description of the Prior Art

In the following specification, the reflector of the present invention will be described as a rear view mirror for an automobile. However, the reflector of the present invention should not be restricted to a rear view mirror of an automobile.

As a glare-shielding type reflector, for example, a reflector which is provided with a liquid crystal cell on a mirror surface has been conventionally known. In case such strong beams from head lamps of a following car are incident on a reflector and a driver is dazzled by the reflection of the beams, a conventional glare-shielding type reflector reduces the light transmittance of the liquid crystal cell by controlling an electric field applied thereto, and thus lessens the intensity of the reflected beams. The application of an electric field, i.e., the driving of the liquid crystal cell, is done by hand operation or automatic operation by use of a photosensor which detects the intensity of the luminous flux (the beams).

However, even when the above-mentioned luminous flux is incident on the reflector, a driver feels dazzled by the bemas reflected from only a part of the reflector surface and not from the entire surface. In other words, the driver is dazzled by the beams from the limited part of the reflector surface on which the image of the head lamps of a following car is projected.

However, the conventional glare-shielding type reflector lessens the reflection from the entire reflector surface equally. Accordingly, the part of the reflector where the beams from the head lamps are reflected is controlled to provide a proper brightness, but the part of the reflector where the contour of a following car should be reflected becomes so dark that the contour is difficult to be recognized.

SUMMARY OF THE INVENTION

The object of the present invention, devised in due consideration of the above matter, is to provide a glare-shielding type reflector only the dazzling part of which is automatically prevented from glaring.

In short, the present invention provides a glare-shielding type reflector having a photosensor block which detects the incident angle of a luminous flux to the reflector and a glare-shielding layer which is divided into plural units and each unit of which is driven individually. As explained later in the preferred embodiments in detail, the reflector of the present invention detects the incident angle of a luminous flux to the reflector by use of a photosensor block, decides the glare-shielding layer units to be driven according to the detected incident angle, and puts only the portion of the reflector corresponding to the glare-shielding layer units into a glare-shielding state by driving the glare-shielding layer units. In other words, the present invention is to put only the portion by which a driver feels dazzled into a glare-shielding state, while the reflectance of other portions, for example, where the contour of a following car should be reflected is not lowered, and therefore, the image of a reflected object can be readily perceived.

DETAILED DESCRIPTION OF THE INVENTION

In a glare-shielding type reflector of the present invention, the incident angle of a luminous flux incident to a reflector from the front side thereof, i.e., the mirror surface side thereof is detected, and a certain portion of the reflector surface by which a driver may feel dazzled is specified on the basis of the detected incident angle, and then the specified portion is turned to be glare-shielding.

Figure 1:
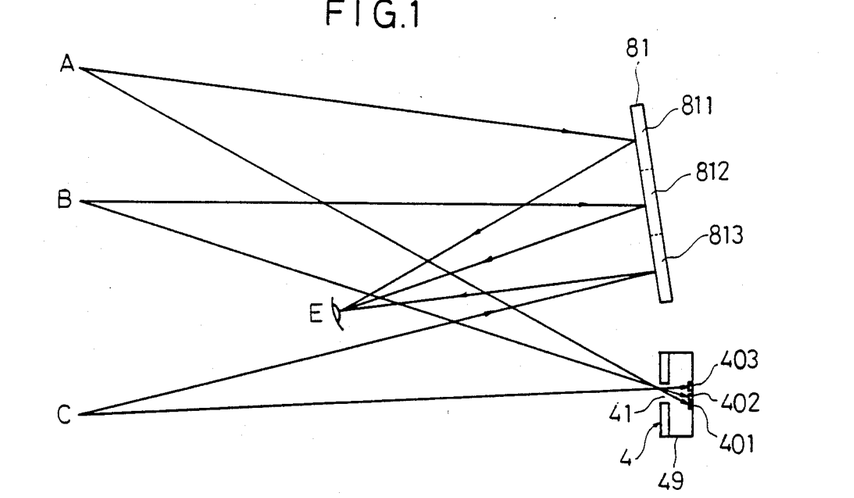
FIG. 1 is an explanatory view for the principle of the present invention.

FIG. 1 is an explanatory drawing for explaining the principle of the present invention.

As shown in FIG. 1, a beam emitted from Point A in the upper front of a reflector 81 is reflected at an upper portion 811 of the reflector, and then arrives at the eyes E of a driver. On the other hand, a beam emitted from Point C in the front is reflected at a lower portion 813 of the reflector, and then arrives at the eyes E of the driver. Therefore, when the headlight of a following car is located at A in FIG. 1 and is incident via the path shown in FIG. 1, the driver may be satisfied if the glare-shielding state is maintained only in the upper portion 811 among the entire reflector surface 81.

The incident angle of a luminous flux to the reflector can be detected by a photosensor block 4 which is shown in the bottom of FIG. 1. A luminous flux emitted from A and incident onto a reflector along the path shown in FIG. 1 is detected by a photosensor 401, after its passage through a slit 41 and arrival at the photosensor 401. Namely, when the photosensor 401 detects a luminous flux, the flux is regarded to have been incident on the reflector along the above-mentioned path. Photosensors 402 and 403 correspond to Points B and C in FIG. 1, respectively.

When the positions of driver's eyes E are varied, the positional relationships are also varied between the incident angle of a luminous flux to the reflector and each of the portions 811, 812 and 813 on the reflector 81, and similarly between each of the portions on the reflector 81 and photosensors 401, 402 and 403. However, the variation can be compensated by positional adjustment of the reflector and the like in accordance with the positions of the eyes E at an initial stage. The initial adjustment may be made by manual or electrical movement of a reflector with reference to, for example, a mark on the rear window of a car, or by suitable processing of initially input positional data.

Figure 2:
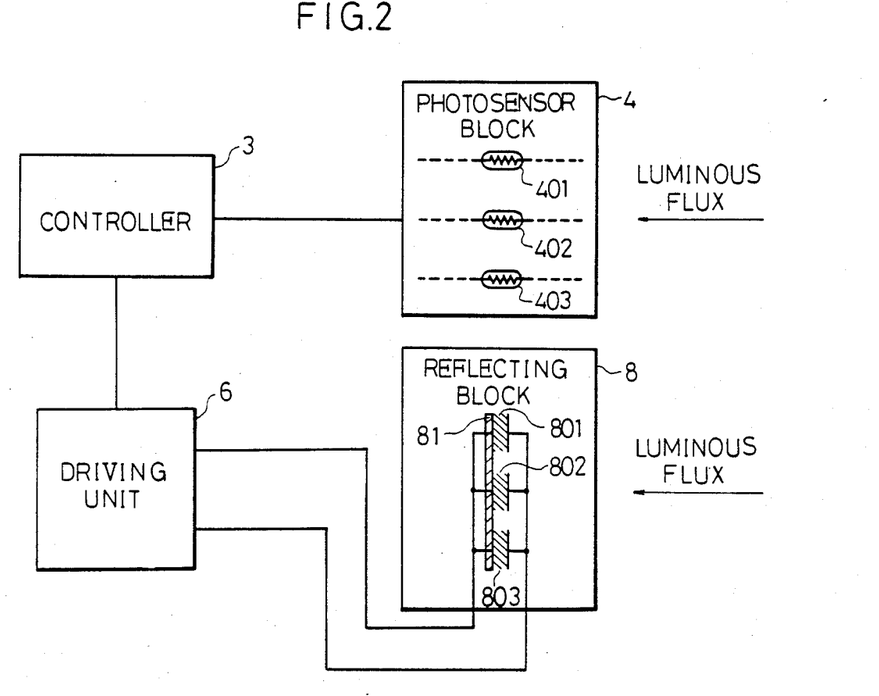
FIG. 2 is a block diagram for showing a constitution of the present invention.

FIG. 2 is a block diagram showing the scheme of the present invention.

The glare-shielding type reflector of the present invention comprises;

a reflecting block 8 which further comprises a mirror 81, and a glare-shielding layer 80 formed on the front surface of the mirror 81, the light transmittance through which may be varied by application of an electric field;

a driving unit 6 which drives the glare-shielding layer 80 by applying an electric field;

a photosensor block 4 which detects the strength of a luminous flux which is incident on the reflecting block 8 from the front of the reflecting block 8; and a controller 3 which outputs a control signal to the driving unit 6 for operating the glare-shielding layer 80, when the intensity of the luminous flux exceeds a prefixed value, wherein, the glare-shielding layer 80 further comprises plural glare-shielding layer units 801, 802, . . . which are defined by dividing the mirror surface and which are driven independently of each other, the photosensor block 4 detects the incident angle of the luminous flux incident to the reflecting block 8, and the controller 3 outputs a control signal for operating a specified glare-shielding layer unit which is decided by the incident angle of the luminous flux.

Figures 3, 4, 7, 8, 9:
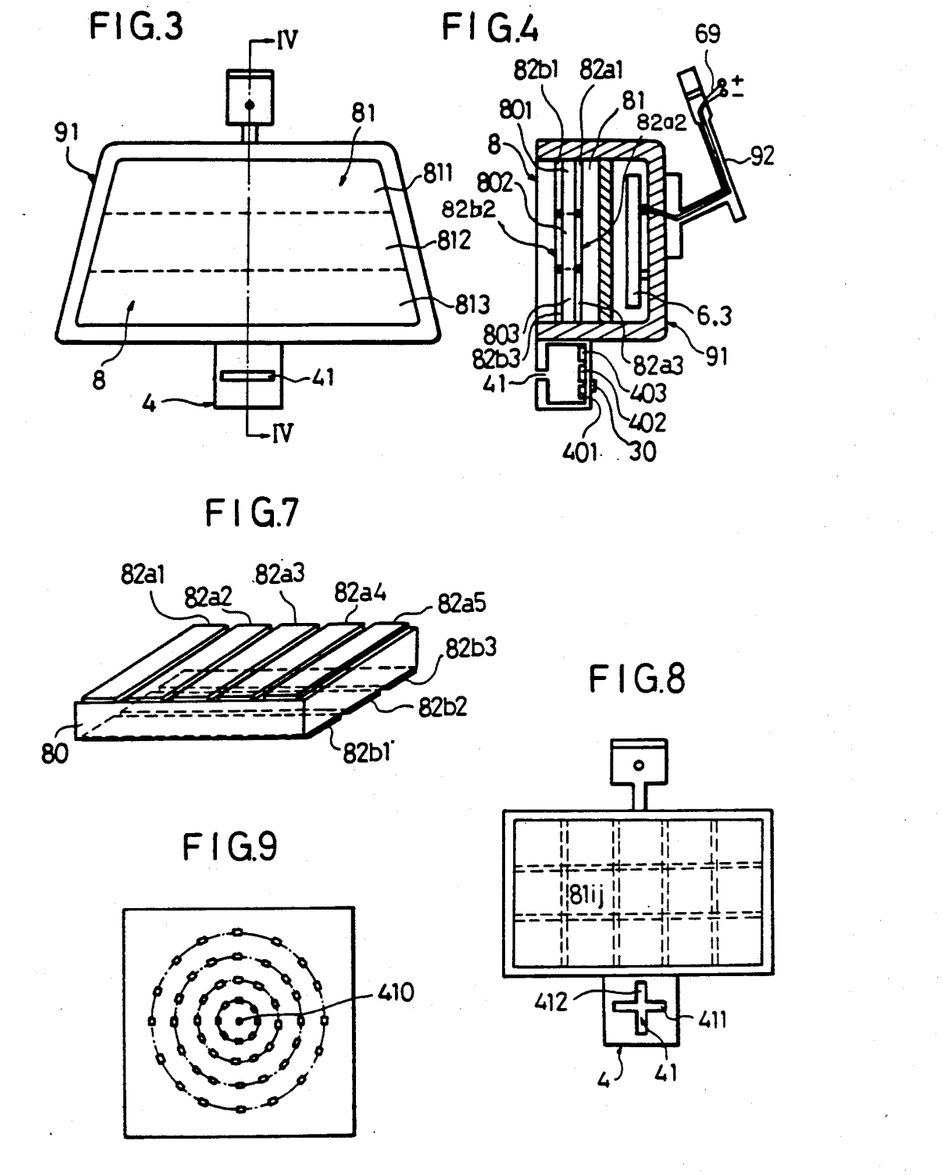
FIG. 3 is a front view of the reflector according to the first embodiment of the present invention.
FIG. 4 is a sectional view along line IV—IV of FIG. 3.
FIG. 7 is a perspective view of the glare-shielding layer of the second embodiment of the present invention.
FIG. 8 is a front view of a reflector of the second embodiment.
FIG. 9 is an explanatory view of a photosensor block in which a pinhole is used as an aperture.

A reflecting block 8 has a mirror 81 and a glare-shielding layer 80 (801, 802 and 803). The mirror 81 has a shape of a plate and the function of reflecting and throwing back an incident light. This mirror 81 is produced by vapor deposition of a metal or a nonmetal, such as zinc sulfate (ZnS), cerium dioxide (CeO$_2$), titanium dioxide (TiO$_2$), aluminum (Al), silver (Ag), chromium (Cr) or gold (Au) on the surface of a glass substrate, or the like. The glare-shielding layer 80 is formed on the mirror surface and has a function of varying the transmittance of the light through the layer 80, according to the average strength of an AC electric field applied to the layer 80 and thus controlling the intensity of the reflected lights. The glare-shielding layer is required to vary the light transmittance electrically. For example, the glare-shielding layer can be formed by use of liquid crystal cells or electrochromic cells. The liquid crystal cells used for this purpose include, for example: a Dynamic Scattering Mode (DSM) type liquid crystal cell which controls the light transmittance by dynamic scattering caused by application of an electric field thereto; a twistnematic liquid crystal cell which controls the light transmittance by use of polarizers and an optical rotation effect of a nematic liquid crystal; a guest-host type liquid crystal cell which includes a liquid crystal mixed with a dichromatic pigment which absorbs a light polarized in a certain direction; a liquid crystal cell which provides the birefringence effect controlled by an electric field; and a liquid crystal cell which provides the phase transition effect between cholesteric and nematic phases. Each of these liquid crystal cells generally intervenes between a pair of parallel transparent glass substrates, and on an inner surface of each glass substrate is installed a transparent electrode layer for applying an electric field to the intervening liquid crystal. The transparent electrode layer may be formed by use of indium stannous oxide (ITO), stannic oxide (SnO$_2$) titanium dioxide (TiO$_2$), indium oxide (In$_2$O$_3$) and the like. The glare-shielding layer 80 of the above construction is divided into plural glare-shielding layer units 801, 802, . . . which can be driven, on the mirror surface individually. In other words, the mirror surface is divided into plural divisions in accordance with the above-mentioned plural glare-shielding layer units. The division may be done, for example, as illustrated in FIG. 3 or FIG. 8. In FIG. 3, the mirror surface 81 is divided into three horizontal strips 811, 812 and 813. As FIG. 4 shows, the division is made by dividing the facing transparent electrodes 82a and 82b into mutually parallel strips 82a1–82a3 and 82b1–82b3, respectively. In FIG. 8, the reflector is divided into a matrix. As FIG. 7 shows, such division is done by dividing each of the facing transparent electrodes into different series of strips 82a1–82a5 and 82b1–82b3, which are orthogonal to each other.

The driving unit 6 has a function of driving the glare-shielding layer 80 by application of an electric field thereto. The driving unit 6 is fed from an external source.

A photosensor block 4 has a function of detecting the intensity and the incident angle of the luminous flux which is incident on the surface of the reflector from the front thereof. For example, the photosensor block 4 has plural photosensors 401, 402, . . . each of which is designed to detect a luminous flux only when the incident angle of the flux to the surface becomes equal to a certain value which is predetermined for each photosensor. As shown in FIG. 1, the detection of the incident angle may be achieved by arranging the photosensors 401, 402 and 403 in proper positions in the rear side of a slit 41 which functions as an aperture. For instance, a light emitted from Point A in the upper front of the reflector passes through the slit 41, and then reaches a photosensor 401 located at the bottom within a black box 49 in the photosensor block 4. Therefore, the luminous flux, which is emitted from Point A and passes along the path shown in FIG. 1, can be detected by the photosensor 401. The photosensor block 4 shown in FIG. 1 detects the vertical variation of the incident angle of a luminous flux. As shown in FIG. 8, the photosensor block 4 can also detect the horizontal variation of the incident angle by use of a vertical slit 412 for the slit 41. Besides, since the slit shown in FIG. 8 has a cruciform shape, the slit can detect both horizontal and vertical variations of the incident angle and any incident angle can be detected by suitable combination of these slits. As a common aperture, a lens or a pinhole may be used as well as a slit. In the use of a lens or a pinhole, it is possible to detect any arbitrary incidental angle by arranging photosensors on concentric circles with the center on an optical axis of such aperture. As a photosensor, such a photoconductive cell as CdS or such a photogalvanic cell as photodiode may be used. These cells may be arrayed one-dimensionally or two-dimensionally to form a photosensor block. In addition, a photosensor block 4 may comprise a pinhole and an image sensor arrayed in the back of the pinhole.

The controller 3 has functions to select the glare-shielding layer unit to be driven in accordance with a detected incident angle of a luminous flux to the surface, and to output the resulting informations to the driving unit 6 as control signals. As typically shown in FIG. 2, when the photosensor 401 detects a luminous flux, (which corresponds to the luminous flux in the path from Point A, as shown in FIG. 1,) the controller 3 selects the glare-shielding layer unit 801 to be driven (to prevent glaring on the upper portion 811 of the mirror 81 as shown in FIG. 1).

The glare-shielding reflector which has the above-mentioned construction can be applied to rearview mirrors of an automobile, such as room mirrors and side mirrors.

DESCRIPTION OF THE PREFERRED EMBODIMENTS

Detailed explanation will be made on preferred embodiments of the present invention.

Embodiment 1

Figure 5:
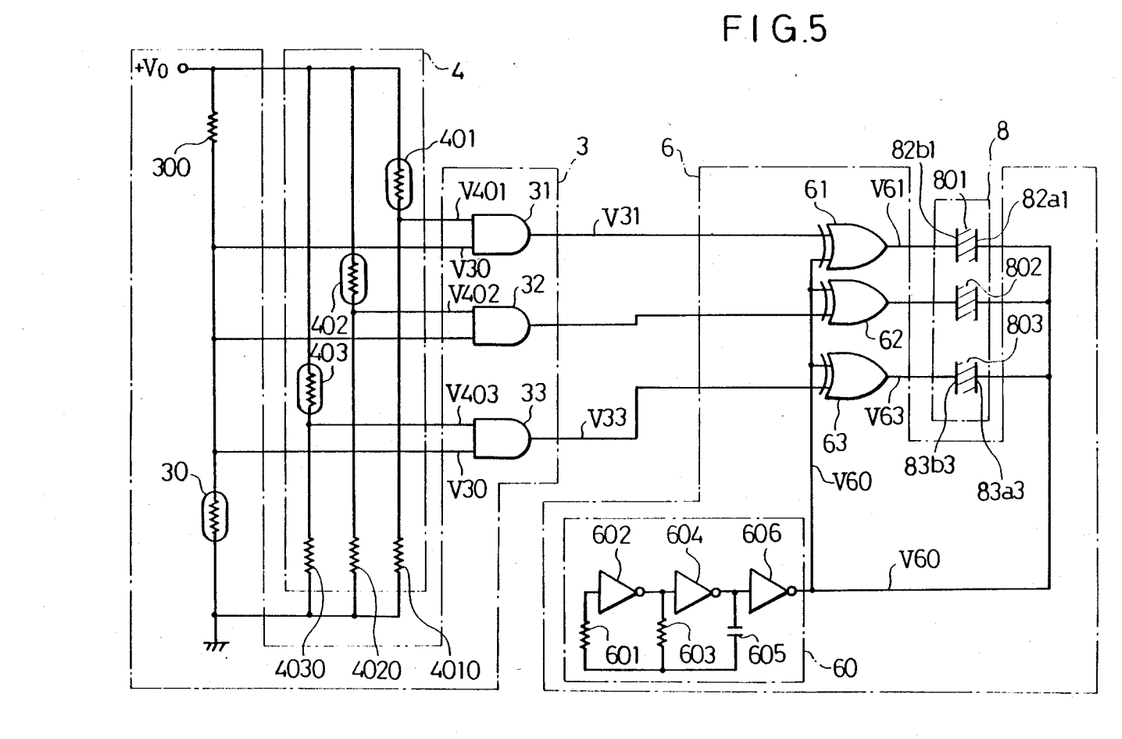
FIG. 5 is an electric circuit diagram for showing an electrical constitution of the first embodiment of the present invention.
Figure 6:
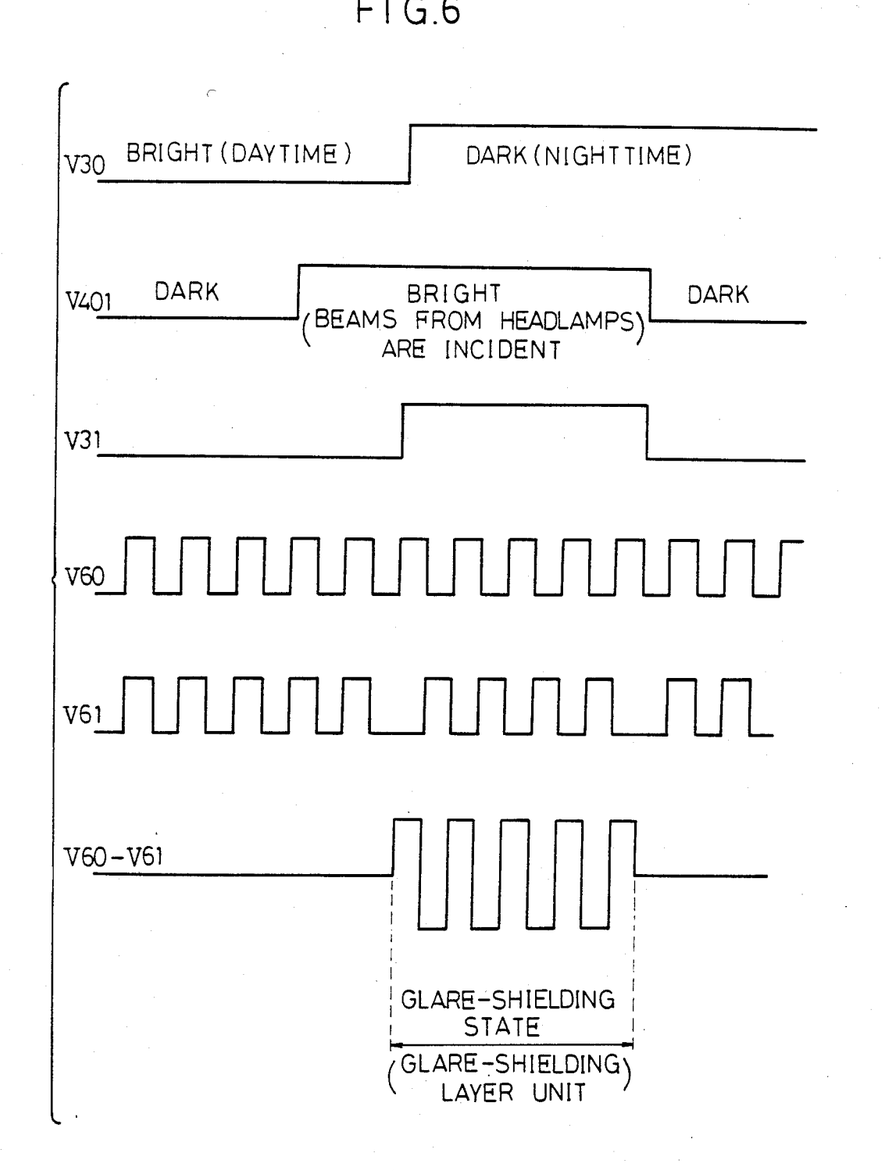
FIG. 6 is a timing chart for explaining the operations of the circuit shown in FIG. 5.

FIG. 3 is a front elevation of the reflector of the first embodiment of the present invention. FIG. 4 is a cross-sectional view taken along the line IV—IV of FIG. 3. And FIG. 5 is a diagram of the electric circuit showing the electrical element of the embodiment. FIG. 6 is a timing chart explaining the operations of the circuit shown in FIG. 5.

As shown in FIG. 3, the present embodiment denotes the case where liquid crystal cell is used as a glare-shielding layer and a mirror 81 is divided into three horizontal strip zones 811–813. As FIG. 4 shows, the division of the mirror 81 is made by dividing the transparent electrode layers 82a and 82b into horizontal strip zones. As shown in FIG. 4, the reflector of the present embodiment comprises a frame 91 which is attached to a car body (not shown) by the supporting member 92, the driving unit 6 and a controller 3 which are fixed within the frame 91, a reflecting block 8 attached to the inner periphery of the frame 91, and a photosensor block 4 attached to the lower portion of the frame 91. And the driving unit 6 is connected through electroconductive wires to a battery power source mounted on the car.

The operations for glare shielding of the reflector will be explained as follows with reference to FIGS. 5 and 6, for the case where a luminous flux emitted from the upper front (Point A in FIG. 1 being supposed) is incident on the reflector of the present embodiment.

The incidence of the luminous flux is detected by a photosensor 401 made of a CdS photoconductive cell. Namely, when the luminous flux is incident, the resistance of the photosensor 401 is lowered. Therefore, the voltage signal V401 which is got by dividing at the ratio of the resistances of the photosensor 401 and a restiance 4010 takes a higher level and is inputted to an AND-gate 31 of the controller 3. The other input terminal of the AND-gate 31 is connected to a resistance dividing point between a resistance 300 and a photoconductive cell 30. The photoconductive cell 30 is a photosensor which detects the brightness around the reflector, and disposed in the back of a sensor 4 as shown in FIG. 4 not to be subject to the effect of the luminous flux. When the reflector is in a bright environment (daytime), the voltage signal V30 which is varied in accordance with the relation of the resistance values of the resistance 300 and the photo conductive cell 30 takes a low level. On the other hand, when it is in dark (nighttime), the voltage signal V30 takes a high level. Accordingly, the output signal V31 of the AND-gate 31 takes a high level only when the reflector is in a dark environment and a luminous flux with a predetermined intensity is incident on the photosensor 401. The signal V31 is inputted to an Ex.OR-gate 61 in the driving unit 6. And, a signal V60 from an oscillating circuit 60 is inputted to the other terminal of the Ex.OR-gate 61. The output signal V61 from Ex.OR-gate 61 is applied to the transparent electrode 82b1 of the glare-shielding layer unit 801. To the other transparent electrode 82a1 is applied the output signal V60 from the oscillating circuit 60. It is when the output signal V31 of the AND-gate 31 takes a high level that V60 (voltage applied to 82a1) and V61 (voltage applied to 82b1) take opposite phases as shown in FIG. 6 and the glare-shielding layer unit 801 is driven. This corresponds to the case where the photosensor 401 detects a luminous flux and a photoconductive cell 30 judges that the environment of the reflector is dark (nighttime).

Thus, when a luminous flux emitted from the upper front of the reflector is detected by the photosensor 401, the glare-shielding layer unit 801 is driven and the upper portion of the mirror surface takes a glare-shielding state as shown in FIG. 3. When a luminous flux is incident on the reflector from the horizontal front of the reflector (Point B in FIG. 1) or the lower front of the reflector (Point C in FIG. 1), the photosensors 402 and 403 detect the flux, respectively and the center portion 812 or the lower portion 813 of the mirror takes a glare-shielding state.

Embodiment 2

FIG. 7 is a perspective fragmental view of the glare-shielding layer of the reflector according to the second embodiment. FIG. 8 is an elevation view of the reflector of the second embodiment.

As shown in FIGS. 7 and 8, the present embodiment corresponds to the case where the glare-shielding layer is divided into a matrix, and the division is made by dividing both of a pair of facing transparent electrodes into strips, and arranging the pair of transparent electrodes to be orthogonal to each other. The aperture 41 of the photosensor block 4 has a cross configuration of slits 411 and 412. The aim of this configuration is to detect not only the vertical variation of the incident angle of a luminous flux but also the horizontal variation thereof. And the photosensors (not shown) are arranged vertically and horizontally in the back of the cross slits. Another type of photosensor block may comprise a pinhole and photosensors concentrically arranged in the back of the pinhole. Since the reflector of the second embodiment has the same construction of the mechanism as in the first embodiment except the glare-shielding layer and the photosensor block, the figure of the mechanism is not described here.

Figure 10:
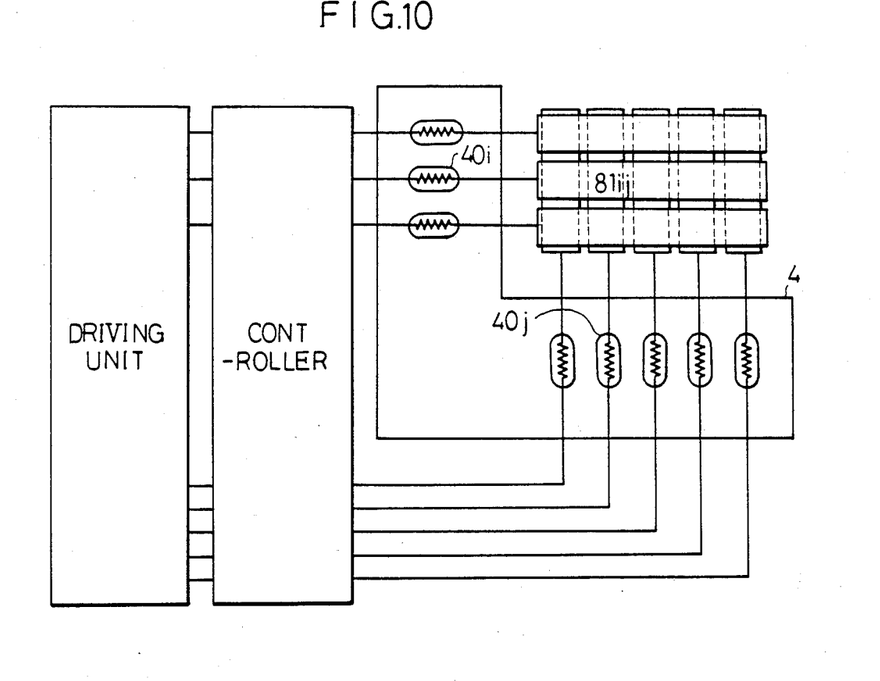
FIG. 10 is a block diagram of an electrical constitution of the second embodiment.
Figure 11:
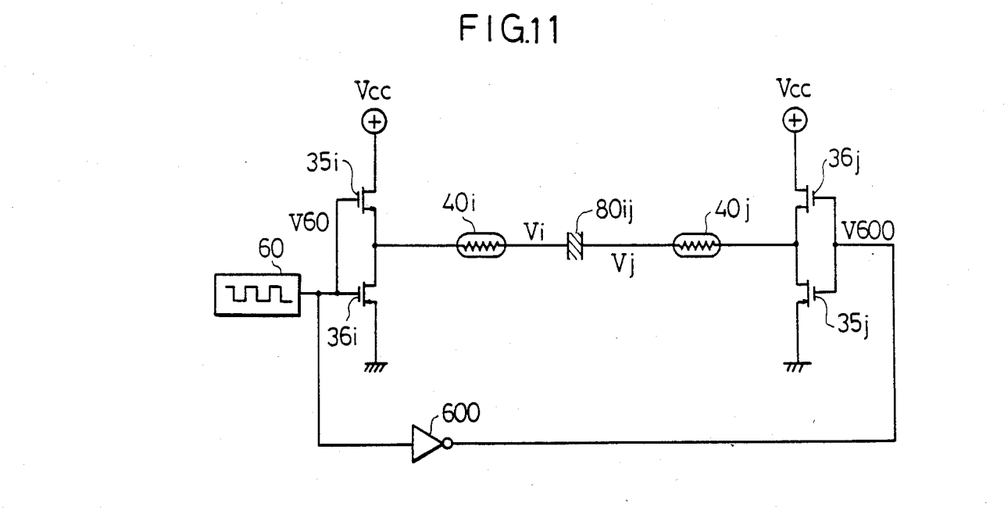
FIG. 11 is an electric circuit diagram for explaining the block diagram in FIG. 10.
Figure 12:
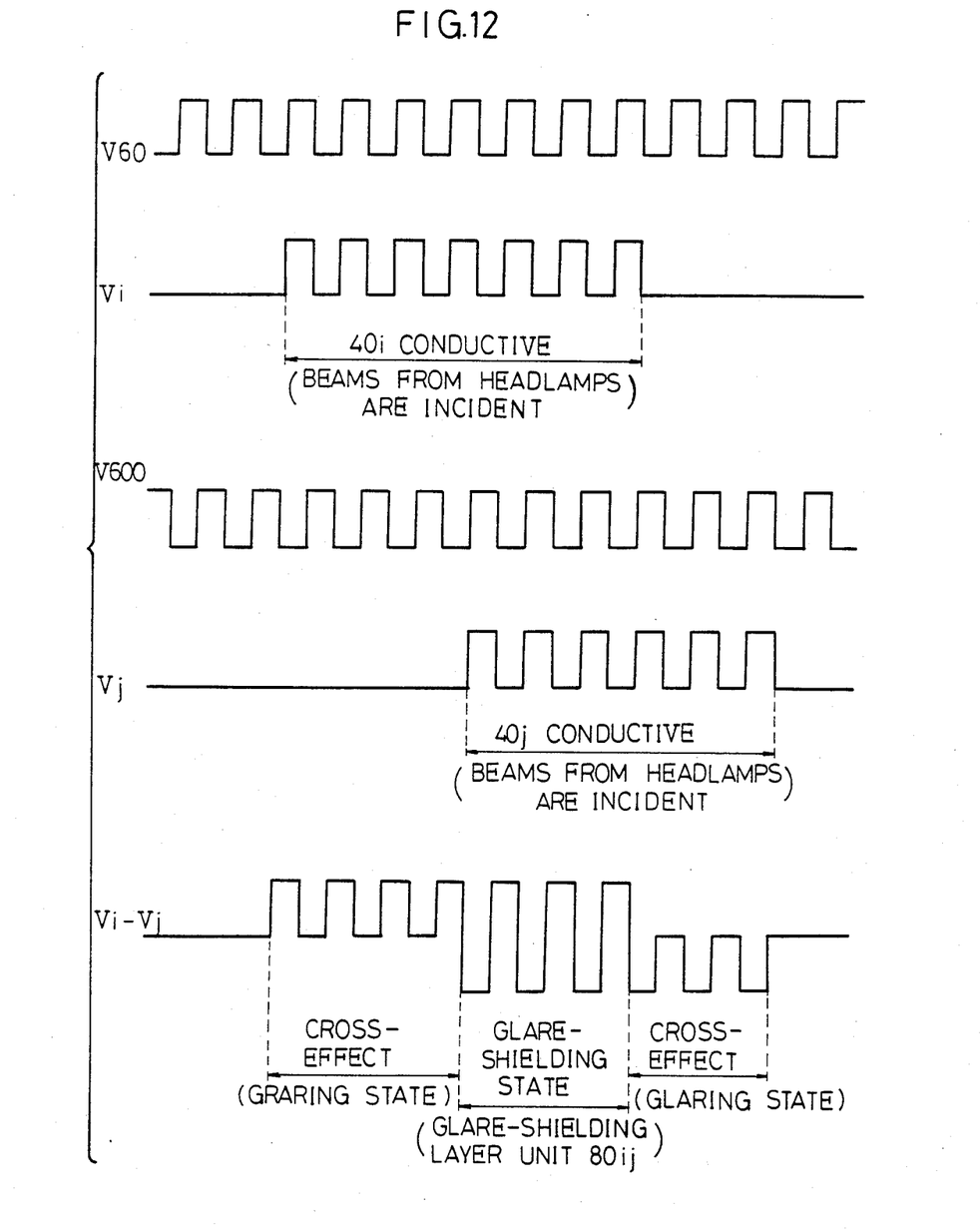
FIG. 12 is a timing chart for explaining the operations of the circuit shown in FIG. 11.

FIG. 10 is a block diagram of the electrical construction of the reflector of the second embodiment. FIG. 11 is an electric circuit for explaining the block diagram of FIG. 10. And FIG. 12 is a timing chart for explaining the operations of the circuit in FIG. 11. The photosensors 40$i$ and 40$j$ detect vertical and horizontal incident angle of a luminous flux to the reflector, respectively. As shown in FIG. 11, the voltages V$i$ and V$j$ are applied to the glare-shielding layer unit 80$ij$ (the unit on i-th row and j-th column), only when the photosensors 40$i$ and 40$j$ are in electrical conduction (are detecting a luminous flux). The applied voltages V$i$ and V$j$ are designed to have opposite phases by proper arrangement of field-effect transistors 35$i$, 36$i$, 35$j$ and 36$j$, an inverter 600, and an oscillating circuit 60. Accordingly, only when both the photosensors 40$i$ and 40$j$ detect a luminous flux as shown in FIG. 12, the glare-shielding layer unit 80$ij$ is driven and the mirror surface unit 81$ij$ takes a glare-shielding state. The same explanation can be applied to another glare-shielding layer units.

What is claimed is:

1. A glare-shielding type reflector comprising:
   a reflecting block having a mirror for reflecting incident light rays which impinge upon said reflecting block at different angles;
   a plurality of glare-shielding layers individually formed on an incident side of said mirror said layers being driven individually;
   a driving means for individually driving said plurality of glare-shielding layers by application of an electric field thereto;
   a photosensor means for detecting incident angle and intensity of each of said incident rays reflected on said mirror through each of said glare-shielding layers; and
   a control means for generating a control signal to allow said driving means to drive at least one of said glare-shielding layers in response to said incident angles of incident rays.

2. A glare-shielding type reflector according to claim 1, wherein:
   said plurality of glare-shielding layers are liquid crystal cells which are formed by dividing at least one of opposing transparent electrode layers of a liquid crystal cell formed on said mirror into a plurality of divisions.

3. A glare-shielding type reflector according to claim 2, wherein
   both of said opposing transparent electrode layers are divided into strips respectively and one series of strip electrodes is arranged orthogonally to another series of strip electrodes.

4. A glare-shielding type reflector according to claim 7, wherein
   said photosensor means comprises plural photosensors, each of which detects predetermined incident angle of said luminous flux, respectively.

5. A glare-shielding type reflector according to claim 4, wherein
   said photosensors have a common aperture and are located at specified positions in the back of said aperture.

6. A glare-shielding type reflector according to claim 1, wherein said photosensor means has a pinhole and an image sensor situated in the back of said pinhole.

* * * * *